CODE VALIDITY SYSTEM AND METHOD FOR SERIALLY CODED PULSE TRAINS

Filed Oct. 8, 1962 2 Sheets-Sheet 1

INVENTOR.
LAURENCE MOORE
BY Harvey G. Lowhurst
ATTORNEY

May 17, 1966 L. MOORE 3,252,139

CODE VALIDITY SYSTEM AND METHOD FOR SERIALLY CODED PULSE TRAINS

Filed Oct. 8, 1962 2 Sheets-Sheet 2

INVENTOR.
LAURENCE MOORE
BY
Harvey S. Lowhurst
ATTORNEY

United States Patent Office 3,252,139

Patented May 17, 1966

3,252,139

CODE VALIDITY SYSTEM AND METHOD FOR SERIALLY CODED PULSE TRAINS

Laurence Moore, Menlo Park, Calif., assignor to Moore Associates, Inc., San Carlos, Calif., a corporation of California Filed Oct. 8, 1962, Ser. No. 229,135
12 Claims. (Cl. 340—146.1)

This invention relates generally to a system and a method for detecting errors in or checking the validity of an incoming coded pulse train and, more particularly, to a system and method for providing assurance that a decoded pulse train properly reflects the information encoded upon the pulse train so that any action which is to be taken in response to the decoded information is only taken when such decoded information is properly received.

Transmission of coded information from an encoder unit to a decoder unit by means of a transmission link is a common occurrence in today's technology and has found wide application in computer systems, monitoring systems and many others. This invention will be described with reference to a monitoring system for monitoring a plurality of functions having a first or a second condition and remotely located from a decoding system. Basically, such systems comprise an encoder for serially encoding the conditions of a plurality of functions continually upon a pulse train utilizing multiplex time-division techniques.

These pulse trains may then be transmitted over suitable communication links, such as telephone lines, VHF or microwave radio, or other well known means, to a decoder station. The decoder station decodes the serially encoded pulse trains to continually provide an indication of the condition of each of the monitored functions. Upon a change of condition of a function, certain corrective steps are usually taken to return the function to a selected condition. Such a change of condition may therefore be termed a change order. This invention is to guard against the taking of corrective steps in response to erroneous change orders.

It is a well known fact that no matter how carefully the transmission link is constructed and operated there is always a certain probability of failure whereby the transmitted pulse trains and the received pulse trains are not the same. Example of such failure may be a fading of the signal, or the sudden occurrence of noise drowning out the signal, or certain kinds of interference transmitting only a portion of the coded pulse train.

Also, intermittent failure of either the encoder or the decoder or portions thereof will result in erroneous change orders of the decoded information which may be corrected by the following decoded pulse train. In case of such error, this invention will also provide a means of preventing response to erroneous change orders.

Even though this code validity system and method is described with special reference to a supervisory or monitoring system, it will become evident that the invention is likewise applicable to any system utilizing a serially coded pulse train in which the pulse train has a cycle which designates the separation of two successive pulse trains.

In monitoring systems, the incoming serially coded pulse train is endlessly repeated and unless the monitored functions change their state, the pulse trains will be identical. Since the code validity system of this invention depends on the reception of two identical pulse trains, it is ideally suited for such systems. The code validity system of this invention is also useful in the transmission of digital data or any kind of serially coded information in which a "word" is transmitted comprising a number of bits. Use of the code validity system of this invention merely requires that each word be repeated a second time.

Heretofore several schemes have been utilized in the prior art to detect code errors or to check the validity of decoded information, each of which required extensive checking equipment and often necessitated the generation of special error detecting codes. While many of these error detecting schemes provided suitable error detection, the addition of such extensive checking equipment increases their price and bulk in proportion to the degree of security desired and the generation of special error detecting codes decreases the capacity by utilizing certain portions or channels thereof for the sole purpose of providing security or validity checks.

It is therefore a primary purpose of this invention to provide a code security or validity system and method therefor which requires a minimum of equipment in addition to that necessary to implement the normal decoding functions and output circuits.

It is another object of this invention to provide a simple and economical system and method to detect errors in serially coded pulse trains and to thereby check the validity of decoded information.

It is a further object of this invention to provide a code validity system and method therefor to check the decoded information of successively received serially coded pulse trains.

It is still another object of this invention to provide an economical and reliable means of checking the validity of a transmitted serially coded pulse train by comparing the decoded information of the same with the decoded information of the immediately preceding pulse train and to accept information as valid only when the information decoded from two successive pulse trains is the same.

Briefly, in one embodiment of the present invention, the code validity system forms a part of a decoder station which utilizes the serial code of the pulse train to sequentially set the stages of an output register. The condition of each stage of the register provides an indication of the condition of functions serially encoded upon the received pulse train. A change of the condition of a stage is a change order.

Each stage of the output register is connected to a common line which provides an output pulse upon receiving a change order. This output pulse is utilized to "reset" a first and second binary storage device. When "reset," the second storage device provides a signal which is utilized to prevent the execution of corrective action in response to a change order.

The signal corresponding to the interval between two successive pulse trains is utilized to "set" the first storage device and is gated with the output signal of the first device. The gated signal is also used to "set" the second device so that when two consecutive pulse trains are received which are identical, the second device is "set" to indicate proper operation.

Other objects and a better understanding of the invention may be had by reference to the following description, taken in conjunction with the accompanying drawings, in which.

Figure 1:
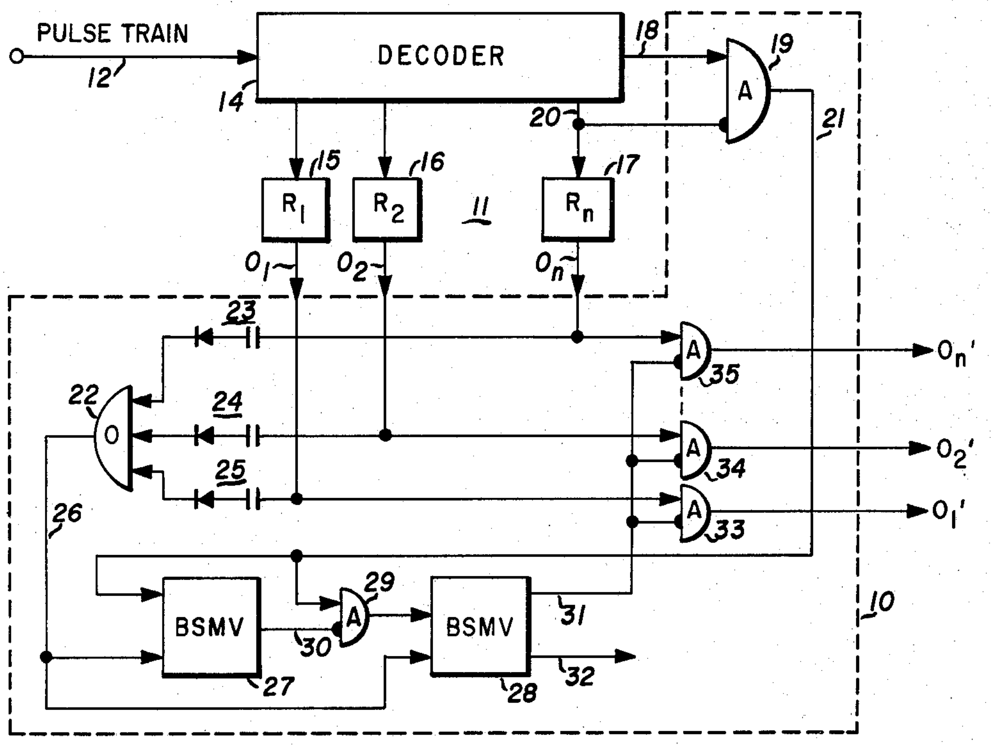
FIG. 1 is a schematic circuit diagram of the validity check system of this invention.

Referring now to the drawings, and particularly to FIG. 1 thereof, there is shown a code validity system 10, constructed in accordance with this invention and utilized with a decoder station 11. An incoming serially coded pulse train 12, transmitted from an encoding station over a transmission link (not shown), is received by a decoder 14. Decoder 14 is constructed to sequentially set the individual stages $R_1, R_2 \ldots R_n$ of an output register R in accordance with the condition of the decoded pulses. Stages $R_1, R_2 \ldots R_n$, indicated at 15, 16 and 17, may be bistable devices such as multivibrators or flip-flops.

The output leads from the individual stages of register R provide output signals indicative of the state of the individual stages and are indicated respectively as output quantities $O_1, O_2 \ldots O_n$, the subscript corresponding to the stages of register R. Output quantities $O_1, O_2 \ldots O_n$ are applied to a utilization means (not shown) such as, for example, a lamp to provide individual indication of the condition of each stage of register R. Usually, one condition of the stages 15, 16 and 17 signifies normal operation, and the other condition abnormal operation requiring some corrective action. A change of the stage from indicating normal to abnormal is called a change order.

A suitable encoding, transmission and decoding system may take the form described in any one of my copending applications, Serial No. 862,955, filed September 30, 1959, and entitled, "Digital Telemetering System"; Serial No. 138,114, filed September 14, 1961, and entitled, "Digital Monitoring System"; and Serial No. 208,210, filed July 9, 1962, and entitled, "Encoding System and Method." Of course, as previously indicated, any decoding system for serially coded pulse trains may be provided with the code validity system 10 as will now be fully described.

Figure 3:
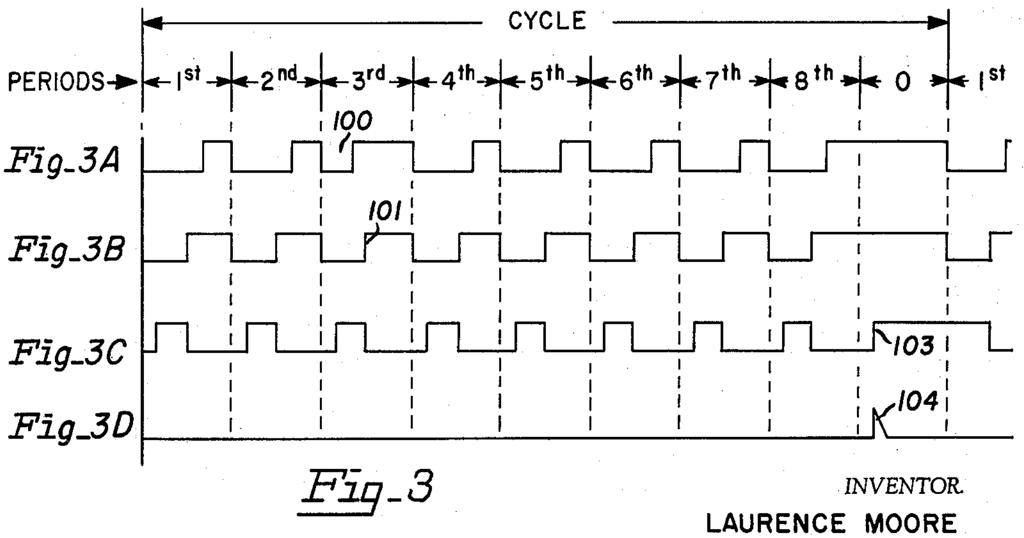
FIGS. 3A to 3D are a series of timing diagrams illustrating the wave forms of the electrical signals at different points in the circuit of FIG. 2.

Stages 16, 17 and 18 of register R are set sequentially by decoder 14 in accordance with the condition of each pulse in a pulse train, such as the one illustrated in FIG. 3A. Successive frames of coded pulse trains are separated by a synchronization periods which is converted by decoder 14 into a synchronization pulse and made available on a lead 18. The synchronization pulse is used internally in decoder 14 to reset itself after reception of a frame of coded pulses and forms an important timing operation indicating the end of a frame.

The synchronization signal on lead 18, also referred to as the cycle signal because it determines the cycle of the pulse train, may be gated by a conventional AND gate 19 which is enabled by input lead 20 connected to last stage 17. Utilization of gate 19 is not essential in practicing the present invention but provides a means and method to check whether or not the signal on lead 18 is actually the cycle signal. Since decoder 14 is sequentially advanced by the individual pulse in the incoming pulse train and reset by the cycle signal, gating of the cycle signal by utilizing the sequential timing circuit of the decoder provides maximum assurance that signal on lead 21 is, in fact, the cycle signal.

The output signals of the individual stages of register R, namely, quantities $O_1$, $O_2$ to $O_n$ are connected to the terminals of a conventional OR gate 22 through a pulsing and isolation network, generally indicated as 23, 24 and 25 respectively. Connected in this manner, a change order pulse is generated each time one of the stages $R_1, R_2 \ldots R_n$ changes its stage. The change order pulse is transmitted through OR gate 22 to output lead 26.

A pair of bistable devices such as bistable multivibrators 27 and 28 form the major equipment portion of the code validity system of this invention and are triggered by the signals on leads 21 and 26 respectively. More particularly, lead 21 is applied directly to the "set" terminal of multivibrator 21 and indirectly to the "set" terminal of multivibrator 28 through a conventional AND gate 29. The high output terminal 30 is utilized as an enabling gate signal to open and close gate 29 according to its state.

The change order signal is applied, via lead 26, to the "reset" terminals of both multivibrators 27 and 28 that whenever a change order is received by any of the stages of register R, both multivibrators 27 and 28 are immediately reset.

Bistable multivibrator 28 has the usual two output terminals to which output leads 31 and 32 may be connected. The output signals on leads 31 and 32 are of course complementary so that only one may be utilized. Lead 32 may be connected to some utilization network (not shown), such as a warning light to indicate that no action should be taken with regard to the information set into register R.

Lead 32 may be entirely dispensed with or may be utilized as a gating signal to operate upon gates 33, 34 and 35 to open the same only if multivibrator 28 is "set." Output quantities $O_1, O_2 \ldots O_n$ may be applied to gates 33, 34 and 35 respectively to provide gated output quantities $O_1', O_2' \ldots O_n'$. In this manner, no output quantities are applied to an output quantity utilization means (not shown) unless mulivibrator 28 is in its "set" state.

In operation, the individual stages of register R are set by decoder 14 upon reception of pulse train in accordance with the state of the coded pulses. The individual stages then provide the output quantities $O_1\ O_2 \ldots O_n$, which may or may not reflect the true condition of the information received, coded upon the pulse train. Assuming that the preceding two trains were properly transmitted, received and decoded so that the stages of register R properly reflect the condition of the monitored function, and further that incoming (first) pulse train underwent a failure of transmission or that a function actually changed its state, such failure or change will initiate the following sequence of events.

Since the incoming pulse train differs from the previously received pulse train in some manner, one or more of the stages of register R will be reset, thereby providing change orders which cause the generation of change pulses which are passed through OR gate 22 and which "reset" both multivibators 27 and 28. As a consequence thereof, output line 32 will be high to suitably indicate that no response to such change orders should be made. In case output quantities $O_1, O_2 \ldots O_n$ are gated, the change order is not transmitted to the final utilization network.

At the end of the first pulse train, a synchronization or cycle signal is generated by decoder 14 which is applied, through AND gate 19 and lead 21, to "set" mulivibrator 27. Since multivibrator 27 was in its "reset" state, AND gate 29 remains closed during the application of the cycle pulse to gate 29 and multivibrator 28 is not "set."

In case the first pulse train actually underwent a failure of transmission, the second pulse train (assumed to be properly received) will initiate new change orders to properly set stages 15, 16 and 17. These new change orders will again generate a change pulse which "resets" both multivibrators 27 and 28 thereby blocking transmission of the output quantities $O_1', O_2' \ldots O_n'$. The end of the second pulse train again initiates a cycle signal which sets multivibrator 27 but not multivibrator 28. Also, gate 29 is opened.

Upon arrival of the third pulse train (assumed to be exactly the same as the second) no change orders are received, so that multivibrator 27 remains in its "set" state. At the end of the third pulse train, the cycle signal passes through gate 29 to "set" multivibrator 28 which thereby opens gates 33, 34 and 35 to allow output quantities $O_1, O_2 \ldots O_n$ to pass to their respective utilization network.

In case the first pulse train truly reflected a change order, the second pulse train (assumed to be identical to the first pulse train) will not generate any change orders so that multivibrator 27 remains set and gate 29 remains open. At the end of the second pulse train, the cycle signal therefore can pass through gate 29 to "set" multivibrator 28 to indicate proper operation of the code validity system.

Instead of utilizing two separate AND gates 19 and 29, it will be immediately evident that a single three input AND gate may be used in which lead 20 and lead 30 provide the enabling or gating signals to open and close the gate to gate the cycle signal on lead 18.

It is also to be observed that the code security system of this invention not only provides assurance that the individual pulses coded upon the pulse train are checked for errors, but also provides assurance that the synchronization signal on lead 18 is properly decoded. As will be explained hereinafter, since the cycle signal determines the beginning of a sequence and each pulse advances the decoder, gating of the cycle signal with the last counting stage provides maximum assurance of a proper cycle signal. The likelihood of opening gate 19 at the wrong time is practically impossible since the sequential operation of decoder 14 depends on the individual pulses of the received pulse train and the resetting of the sequence with the cycle signal.

Figure 2:
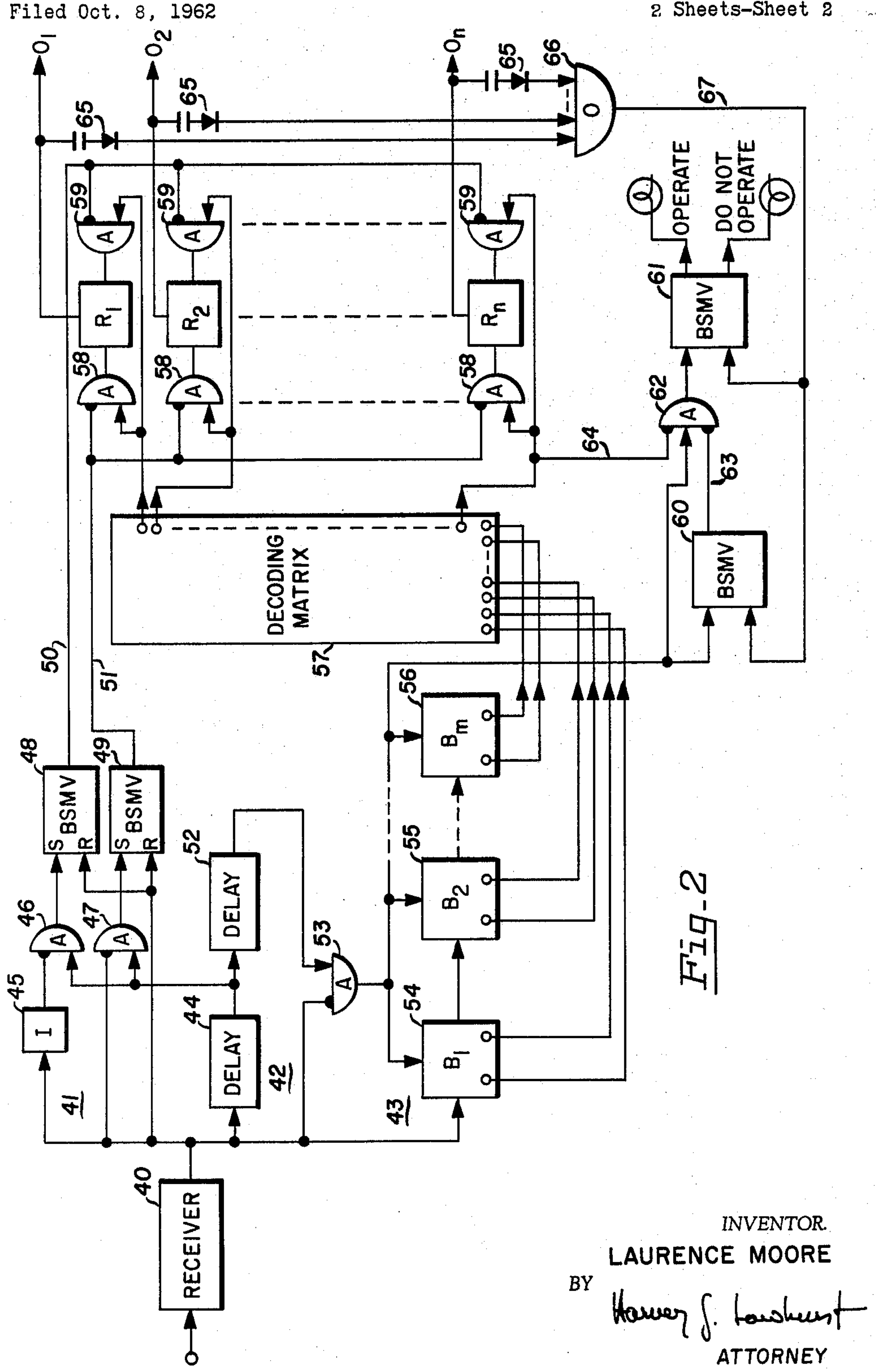
FIG. 2 is a schematic circuit diagram of a decoder incorporating the security checking system of this invention.

Referring now to FIG. 2, there is shown a complete decoding system incorporating the code validity system of this invention. A serially coded pulse train, such as shown in FIG. 3A, is received by a receiver 40 and is simultaneously applied to a bit recognition channel indicated at 41, a synchronization or cycle recognition channel indicated generally at 42, and a sequencing or counting channel indicated generally at 43.

As shown in FIG. 3A, and as fully explained in the above-identified co-pending applications, the incoming pulse train has a predetermined cycle which is divided into nine periods. The first eight periods each include a pulse which has a first or second predetermined width in accordance with the condition of an associated function. The ninth period includes a pulse of greater width than the width of the coded pulses to indicate the end of one or the beginning of another wave train.

The operation of a bit recognition channel 41, cycle recognition channel 42 and sequencing channel 43 of FIG. 2 is fully explained in the above-referenced co-pending applications. Briefly, the pulse train of FIG. 3A is applied to a first delay network 44 which may comprise a suitable monostable multivibrator. Device 44 is consecutively triggered by the negative going edge of each pulse of the received pulse train and is set to return to its quiescent state one-half of a pulse period later. In other words, device 44 provides a delay of one-half of a period to the incoming pulse train as shown in FIG. 3B. Delay 44 may be considered a part of both the bit recognition channel 41 and the cycle recognition channel 42.

The pulse train of FIG. 3A is also applied to the other components of bit recognition channel 41, namely an inverter 45, a pair of AND gates 46 and 47, a pair of bistable devices 48 and 49, and a pair of output lines 50 and 51 which apply gating signals to either one or the other of the input terminals of a plurality of stages $R_1$, $R_2 \ldots R_n$ of an output register R. More particularly, inverter 45 reverses the polarity of the pulse train so that the pulses applied to gate 46 are the complement of the pulses applied to gate 47 so that either gate 46 or 47 is opened but not both simultaneously. If a negative voltage opens gate 47, then gate 47 is normally open during the time of occurrence of pulse 100 when the set pulse, that is the positive going edge 101 of the delayed pulse train (FIG. 3B) is applied and bistable multivibrator 49 is "set" during normal operation.

However, if an abnormal condition is encountered, so that the negative pulse 100 in the incoming wave train is short, gate 47 is closed when positive going pulse edge 101 occurs which is therefore passed through complementary gate 46 to "set" bistable multivibrator 48. In this manner each bit of the incoming pulse train is recognized and complementary output leads 50 and 51 are respectively either high and low or low and high, depending on the condition of the pulse.

Cycle recognition channel 42 includes a second delay 52 which may comprise a suitable monostable multivibrator triggered by the positive going edge 101 of the delayed pulse train from delay 44 and which is set to return to its quiescent state two-thirds of a period later. The twice delayed pulse train which is provided at the output of delay network 52 is shown in FIG. 3C, and its positive going edge 103 is utilized as a set pulse applied to an AND gate 53. Gate 53 is enabled by the incoming pulse train so that the positive portion of the incoming pulse train opens gate 53. As can be best seen by comparing the timing diagrams of FIGS. 3A and 3C, the only time gate 53 is open at the same time as the occurrence of a positive going pulse such as edge 103, is one-sixth after the end of the eighth period. In this manner cycle signal 104 is obtained to denote the interval between successive pulse trains.

Sequencing channel 43 comprises a plurality of binary devices 54, 55 and 56 and a matrix 57 which is sequentially advanced by binary devices 54, 55 and 56 in a manner well known to those skilled in the art. Binary devices 54, 55 and 56 are reset to their starting level by application of the cycle pulse from gate 53 to mark the beginning of a new wave train. Thereafter the binary devices are advanced by the negative going edge of each pulse in the customary manner.

The individual stages $R_1, R_2 \ldots R_n$ of a register R have their "set" and "reset" terminals controlled by individual groups of AND gates respectively indicated at 58 and 59. Gate group 58 is enabled by output lead 51 and gate group 59 is enabled by output lead 50 (the voltage on the latter being the complement of the voltage on the former so that either gate group 58 or gate group 59, but not both, are open).

Each of the output terminals of matrix 57 is connected to apply its set pulse to the two AND gates controlling a different stage of register R. Accordingly, each stage is set in accordance with the gate opened by bit recognition channel 41.

There is also provided a pair of memory devices 60 and 61 such as bistable multivibrators and a triple input AND gate 62. The cycle signal from gate 53 is applied directly to the "set" terminal of device 61. Gate 62 is enabled by the output voltage of device 60 through lead 63 and the output voltage which sets the last stage $R_n$ of register R via lead 64. As explained in connection with FIG. 1, each of the output leads from stages $R_1, R_2 \ldots R_n$ of register R is connected, via a pulse generating means and an isolation means generally indicated as 65, to the input circuit of an OR gate 66. OR gate 66 is connected, via lead 67, to the "reset" input terminal of devices 60 and 61. Bistable device 61 has two output terminals, one of which is marked "Operate" and the other one is marked "Do Not Operate."

The operation of the code validity system of FIG. 2 is the same as that explained in connection with FIG. 1 whereby two successive identical pulse trains must be decoded before the code validity system approves a response to a change order. More particularly, bistable device 60 is "set" each time during the interval between two successive incoming pulse trains. However, bistable device 61 is only "set" when the voltage on lead 63 is high so that gate 62 is open to pass the cycle signal therethrough. This only occurs if two identical pulse trains are successively received.

In the application of the above described code validity system to the transmission of coded information, to say a computer, each information cycle, that is a "word," is repeated. If the repeated words are identical, multivibrator 28 will be "set" to admit the decoded information to the computer. In case there is some error which causes two successively transmitted words to be different, multivibrator 28 will be "reset" and the decoded information is not passed to the utilization means. The state of multivibrator 28 may then be utilized to transmit a signal to the encoder to repeat sending the "word" until two successive words are received which are identical. A change of state of multivibrator 28 then cuts off the request to repeat and the encoder will advance to the next word.

Even though it may appear that sending each word twice doubles the transmission time, it must be realized that with the system of this invention a much higher degree of security is obtained. Accordingly, the information may be now transmitted at a faster rate since the code validity system permits transmission nearer the theoretical capacity of the channel where some mutilation will take place because detection of mutilation is provided. The effect of utilizing the code validity system of this invention may increase in usable information transmission rate over a given bandwidth in the presence of interference or noise.

There has been described a code validity system which utilizes a minimum of equipment and provides assurance that the received code was properly transmitted. Specifically, the code validity system and method of this invention utilizes a pair of bistable devices, an AND gate, and an OR gate as its basic components. One of the bistable devices provides an output signal indicating whether or not the preceding two wave trains were identical or not so that the validity of the decoded information may be accepted or rejected accordingly.

What is claimed is:

1. A code validity system for use with a decoding system which is responsive to a serially coded pulse train of predetermined cycle in which each pulse has a fixed predetermined period and has a first or a second condition in accordance with condition of an associated function in which stages of an output register are set sequentially in accordance with the condition of each pulse, said system comprising:

(a) a first and second bistable means;
(b) means for setting said first bistable means to a first state at the end of a cycle;
(c) means for setting said second bistable means to a first state at the end of a cycle providing said first bistate means was in said first state at the beginning of said cycle;
(d) means for developing a change signal whenever a stage of said output register changes its state; and
(e) means for applying said change signal to set said first and said second bistable means to a second state, the state of the stages of said output register being accepted as valid only when said second bistable device is in said first state.

2. A code validity system for use with a decoding system which is responsive to a serially coded pulse train of predetermined cycle in which each pulse has a fixed predetermined period and a first and second condition in accordance with the condition of an associated function and in which stages of an output register are set in accordance with the condition of each pulse and in which a cycle pulse is generated of the end of a cycle to indicate a new sequence, said system comprising:

(a) a first and a second bistable means;
(b) means for applying said cycle pulse to set said first bistable means to a first state;
(c) means responsive to the state of said first bistable means for gating said cycle pulse;
(d) means for applying said gated cycle pulse to set said second bistable means to a first state;
(e) means for developing a change signal whenever a stage of said output register changes its state; and
(f) means for applying said change signal to set said first and said second bistable means to a second state, the state of said second bistable means providing an indication of the validity of the state of the stages of said output register.

3. A code validity system in accordance with claim 2 in which said means responsive to the state of said first bistable means for gating said cycle signal is further responsive to a timing signal controlling the setting of a selected stage of said output register.

4. A code validity system in accordance with claim 2 in which each stage of said output register is associated with a utilization means and in which a gate means is interposed between a stage and a utilization means which gate means is responsive to the state of said second bistable means.

5. A decoder system including a code validity system for serially decoding coded pulse trains having a predetermined cycle in which each cycle includes a plurality of pulses each having a fixed predetermined period with said cycle and a first or a second condition, said system comprising:

(a) a bit recognition channel for sequentially determining the condition of each pulse in said pulse trains;
(b) a cycle recognition channel for developing a cycle signal between successive pulse trains;
(c) a sequencing channel including a counter means stepwise advanced by each pulse in said pulse train and returned to a starting condition by each cycle signal;
(d) a register means having a stage associated with each pulse in a cycle, each stage being sequentially set by said advancing counter means in accordance with the condition of its associated pulse as determined by said bit recognition channel;
(e) a first bistable device triggered by said cycle signal to a first state, the output of said first bistable device providing a gating signal;
(f) gating means responsive to said gating signal for gating said cycle signal;
(g) a second bistable device triggered by said gated cycle signal to a first state; and
(h) means associated with each stage of said register means for developing a change pulse whenever the state of a stage changes, said change pulse being applied to trigger said first and second bistable device to a second condition, the state of said second bistable device being an indication of the validity of the state of the stages of said register means.

6. A decoder system including a code validity system for use with serially decoding coded pulse trains having a predetermined cycle in which each cycle includes a plurality of pulses each having a fixed predetermined period with said cycle and a first or a second condition, said system comprising:

(a) a bit recognition channel for sequentially determining the condition of each pulse in said pulse trains;
(b) a cycle recognition channel for developing a cycle signal between successive pulse trains;
(c) a sequencing channel including a counter means stepwise advanced by each pulse in said pulse train and returned to a starting condition by each cycle signal, a selected stage of said counter means providing a first gating signal;

(d) a register means having a stage associated with each pulse in a cycle, each stage being sequentially set by said advancing counter means in accordance with the condition of its associated pulse as determined by said bit recognition channel;

(e) a first bistable device triggered by said cycle signal to a first state, the output of said first bistable device providing a second gating signal;

(f) gating means responsive to said first and second gating signal for gating said cycle signal;

(g) a second bistable device triggered by said gated cycle signal to a first state; and (h) means associated with each stage of said register means for developing a change pulse whenever the state of a stage changes, said change pulse being applied to trigger said first and second bistable device to a second condition, the state of said second bistable device being an indication of the validity of the state of the stages of said register means.

7. A decoder system in accordance with claim 6 in which each stage of said register is provided with a utilization means for indicating its state and gating means interposed between each stage and its associated utilization means, said interposed gating means being operated by a gating signal derived from said second bistable device to prevent actuation of said utilization means unless said second bistable device is in said first condition.

8. A method for checking the validity of a change in the decoded condition of one or more pulses of a received, serially coded, pulse train of predetermined cycle which includes a plurality of pulses each having a fixed predetermined period within said cycle and each being associated with a different function and having a first or a second condition in accordance with the condition of its associated function, said method comprising the steps of:

(a) decoding a cycle of said pulse train and entering the condition of each pulse thereof into an associated stage of a parallel output register for storage;

(b) decoding the immediately succeeding cycle of said pulse train and entering the condition of each pulse thereof into said associated stages for storage thereby displacing the previously stored conditions; and (c) rejecting the validity of the conditions stored in the stages of said parallel output register by said immediately succeeding cycle unless each of its stages remained unchanged during the entering of the conditions of the pulses in said immediately succeeding cycle.

9. A method for checking the validity of a change in the decoded condition of one or more pulses of a received, serially coded, pulse train of predetermined cycle which includes a plurality of pulses each having a fixed predetermined period within said cycle and each being associated with a different function and having a first or a second condition in accordance with the condition of its associated function, said method comprising the steps of:

(a) decoding a cycle of said pulse train and entering the condition of each pulse thereof into an associated stage of a parallel output register for storage;

(b) decoding the immediately succeeding cycle of said pulse train and entering the condition of each pulse thereof into said associated stages for storage thereby displacing the previously stored conditions; and (c) accepting the validity of the conditions stored in the stages of said parallel output register by said immediately succeeding cycle unless at least one of said stages changed its state during the entering of the conditions of the pulses in said immediately succeeding cycle.

10. A method for checking the validity of change orders indicated by changes of the condition of a plurality of pulses in a serially coded pulse train having a predetermined cycle in which each pulse has a fixed predetermined period within said cycle and in which each pulse within each cycle is associated with a different function and has a first or a second condition in accordance with the condition of the associated function, said method comprising the steps of:

(a) continuously decoding successive pulse trains by deriving bit recognition signals for each pulse in the pulse train and cycle signal of the end of a pulse train, and applying the bit recognition signals to associated stages of an output register to store the same;

(b) generating a change signal whenever a stage of said output register changes its state;

(c) applying the change signal to a first and a second bistable device to set the same to a first state;

(d) applying said cycle signal to said first bistable device to set the same to a second state;

(e) gating said cycle signal with a signal from said first bistable device to derive a gated cycle signal;

(f) applying said gated cycle signal to said second bistable device to set the same to a second state; and (g) deferring all action to a change order until said second bistable device is in said second state.

11. A method for checking the validity of change orders indicated by changes of the condition of a plurality of pulses in a serially coded pulse train having a predetermined cycle in which each pulse has a fixed predetermined period within said cycle and in which each pulse within said cycle is associated with a different function and has a first or a second condition in accordance with the condition of the associated function, said method comprising the steps of:

(a) continuously decoding successive pulse trains by deriving bit recognition signals for each pulse within a cycle and a cycle signal of the end of a cycle;

(b) applying each bit recognition signal to a binary storage means associated with the pulse;

(c) generating a change signal whenever a binary storage means changes its state in response to a bit recognition signal;

(d) applying the change signal to a first and a second bistable device to set both to a first state;

(e) applying said cycle signal to said first bistable device to set the same to a second state;

(f) gating said cycle signal with a signal representing the state of said first bistable device to derive a gated cycle signal;

(g) applying said gated cycle signal to said second bistable device to set the same to a second state; and (h) utilizing a signal representing the state of said second bistable device as a check on the validity of change orders.

12. A method for checking the validity of a change order indicated by changes of the condition of a plurality of pulses in a serially coded pulse train having a predetermined cycle in which each pulse has a fixed predetermined period within said cycle and in which each pulse within each cycle is associated with a different function and has a first or a second condition in accordance with the condition of the associated function, said method comprising the steps of:

(a) continuously decoding successive pulse trains by deriving sequentially bit recognition signals representing the condition of each pulse within said cycle and a cycle signal representing the end of a cycle;

(b) applying each bit recognition signal to a binary storage means associated with the pulse;

(c) generating a change signal whenever a binary storage means changes its state in response to a bit recognition system;

(d) applying the change signal to a first and a second bistable device to set both to a first state;

(e) applying said cycle signal to said first bistable device to set the same to a second state;

(f) gating said cycle signal with a signal representing the state of first bistable device and a signal representing the time of occurrence of a storage recognition signal to a selected binary storage means to derive a gated cycle signau;

(g) applying said gated cycle signal to said second bistable device to set the same to a second state; and (h) deferring all responsive action to a change order until said second bistable device is in a selected state.

References Cited by the Examiner

UNITED STATES PATENTS

| | | | |
|---|---|---|---|
| 2,884,625 | 4/1959 | Kippenhan | 340—146.1 |
| 2,910,667 | 10/1959 | Lubkin | 340—144 |
| 3,058,655 | 10/1962 | Arneth | 340—146.1 |

MALCOLM A. MORRISON, *Primary Examiner.*

ROBERT C. BAILEY, *Examiner*

S. SIMON, T. M. ZIMMER, I. FAIBISCH, *Assistant Examiners.*